May 11, 1954      W. VAN GUILDER      2,677,947

BOWL CONSTRUCTION

Filed April 7, 1950

INVENTOR
WALTER VAN GUILDER
BY *William C. Babcock*
ATTORNEY

Patented May 11, 1954

2,677,947

UNITED STATES PATENT OFFICE 2,677,947

BOWL CONSTRUCTION

Walter Van Guilder, River Forest, Ill., assignor to General Mills, Inc., a corporation of Delaware Application April 7, 1950, Serial No. 154,464

3 Claims. (Cl. 65—15)

The present invention relates to bowl constructions and more particularly to improvements in bowls of breakable material and handle attachments for such bowls.

It has been customary in the prior art to provide certain types of glass containers and receptacles with a separate handle attachment. Such handle attachments generally include an annular clamping band designed to fit a circumferential recess in the outer surface of the container or container neck. The provision of such an annular recess in the external surface of a bowl of glass or ceramic material requires the use of more expensive molding equipment in the construction of the bowl and complicates the process of manufacturing such a container. Furthermore, in certain types of containers, there is a definite probability of engagement of other cooking utensils with the upper rim of the container. Where such a bowl is made of breakable material and the clamping band of a handle attachment is located in a recess in the external surface of the bowl, the upper rim of the bowl is exposed and unprotected and is readily chipped or broken by such engagement.

With these defects and problems of the prior art in view, it is accordingly one object of the present invention to provide an improved bowl construction.

It is a further object to provide a bowl construction suitable for use with an improved handle attachment and which can be manufactured with less expensive molding processes and equipment.

Another object is the provision of an improved combination of bowl construction and handle attachment in which the handle attachment protects the upper rim of the bowl from damage during normal use.

Other objects and advantages of the invention will be apparent from the following specification in which a preferred embodiment of the invention is described with particular reference to the accompanying drawings.

Figure 1:
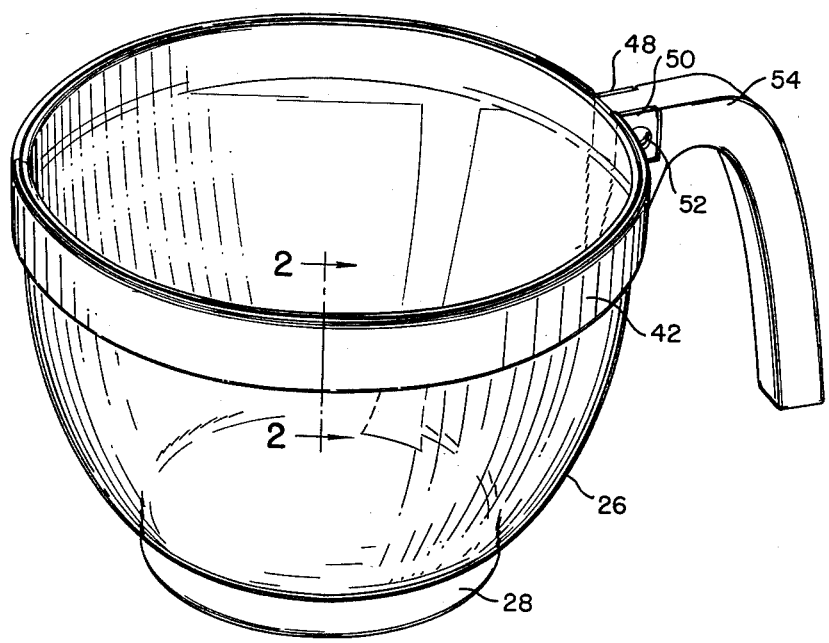

In these drawings, Figure 1 is a perspective view of an assembled bowl and handle attachment according to the present invention.

Figure 2:
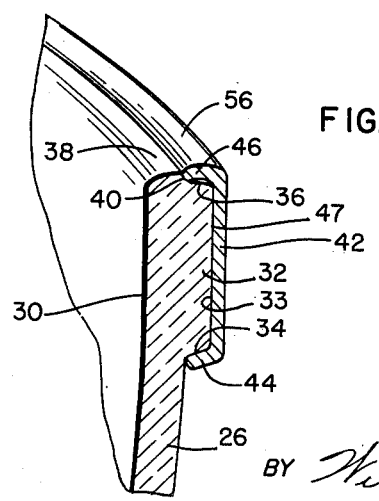

Fig. 2 is a partial sectional view taken along the line 2—2 of Fig. 1.

As shown in Fig. 1, the present invention is disclosed in connection with a glass or ceramic bowl of the type suitable for use in a household food mixer. Such a device may include, in addition to the bowl itself, a separate handle which is attached to the bowl by a suitable circumferential clamping band.

The difficulties and disadvantages of the prior art devices which require special molding equipment are avoided by use of the construction shown in Figs. 1 and 2. As shown herein, the bowl includes the usual body portion 26 and base 28 which are integrally molded of glass or similar ceramic material. The inner surface 30 of the bowl is of gradually increasing internal diameter from the bottom of the bowl toward the upper rim.

As shown in Figs. 1 and 2, the outer surface of the bowl also increases in external diameter from the base to the upper rim of the bowl. This outer surface is provided with a single, integral, external annular bead 32 adjacent the upper rim. This bead or thickened portion constitutes outwardly projecting means having an outer face 33 of greater diameter than the outer wall surface of the remainder of the bowl and thus provides a lower surface or ledge 34 joining the outer face 33 to the adjacent portion of said outer wall surface. This construction similarly provides an upper surface or ledge 36 at the top of the bowl. The outer face 33 of the annular bead 32 is completely free from any re-entrant portions or channels or regions of decreased diameter throughout the region between the lower and upper shoulders 34 and 36.

As indicated in Fig. 2, in the preferred form of the present invention, the upper surface or ledge 36 is located slightly below the upper rim 38 of the bowl, and thus leaves a short, external, vertical wall portion 40 between the upper shoulder 36 of bead 32 and the rim 38 of the bowl.

The handle attachment designed for use in combination with the bowl just described includes an annular clamping band 42 of metallic material having inwardly projecting lower and upper flanges 44 and 46 respectively providing an annular recess 47 at the inner surface of the band for engagement with the annular external bead on the bowl. The clamping band 42 circumferentially embraces the annular bead 32 of the bowl and the inwardly projecting flanges 44 and 46 of the clamping band engage below and above the ledges 34 and 36 respectively on the bowl. The interengagement of these flanges and ledges definitely positions the band 42 and prevents relative axial or vertical movement between the band and the bowl.

The ends of the clamping band 42 may be secured to a handle member in any known manner. As illustrated in Fig. 1, the clamping band 42 has radially projecting ends 48 and 50 which are secured at 52 to the handle member 54. A screw or bolt serves as the attaching means in order that the band and handle may be readily removed from the bowl for cleaning.

An important feature of the preferred form of the present invention is the relationship between the specific location of the upper ledge 36 on the bowl and the thickness of the inwardly projecting upper flange 46 on the clamping band 42. As shown in Fig. 2, the upper ledge 36 is located below the upper rim 38 of the bowl a distance represented by the vertical wall portion 40 which is substantially less than the vertical thickness of the inwardly projecting flange 46. Thus the upper surface 56 of the flange 46 and clamping band 42 will be located above the level of the upper rim 38. Should the user of the bowl strike a spoon or similar utensil against the rim of the bowl in normal manner, the illustrated arrangement will insure the engagement of such utensil against the upper surface 56 of the metallic clamping band, rather than against the glass or ceramic rim of the bowl itself. The probability of chipping or breakage of the bowl rim is accordingly substantially eliminated by the provision of an upper inwardly projecting flange on the clamping band which overlaps the upper ledge 36 of the bowl and is located at a higher level than upper rim 38.

Furthermore the bowl construction illustrated in Figs. 1 and 2 can be readily molded with ordinary equipment and methods in view of the use of a single external annular bead on the outer surface of the bowl and in view of the complete absence of any re-entrant portions between the lower and upper ledges 34 and 36 in the region of maximum external diameter of the bowl.

The construction described above accordingly accomplishes the objects set forth at the beginning of the present specification and provides a bowl and a handle attachment which cooperate in a novel and effective manner to reduce the probabilities of damage during normal use and which can be produced by the most economical methods and equipment.

Since minor variations and changes in the exact details of construction will be apparent to persons skilled in this field, it is intended that this invention shall cover all such changes and modifications as fall within the spirit and scope of the attached claims.

Now, therefore, I claim:

1. A mixing bowl comprising a bowl body having an outer wall surface of gradually increasing external diameter from its base to its upper rim and a single integral external annular bead adjacent said upper rim for attachment of a handle band, said bead having an outer face of greater diameter than said outer wall surface and providing upper and lower substantially horizontal ledges joining the face to said outer wall surface, and said face being substantially straight and completely free of re-entrant portions between said ledges, the upper ledge being spaced a predetermined distance below the upper rim of the bowl and thereby providing an upper outer wall portion against which a portion of the band may engage.

2. A mixing bowl comprising a bowl body having an outer wall surface of gradually increasing external diameter from its base to its upper rim and a single integral external annular bead adjacent said upper rim for attachment of a handle band, said bead having an outer face of greater diameter than said outer wall surface and providing upper and lower substantially horizontal shoulders joining the face to said outer wall surface, said face being substantially straight and completely free of reentrant portions between said shoulders, and said upper shoulder being spaced a predetermined distance below the upper rim of the bowl, said distance being less than the thickness of the handle attachment band with which the bowl is to be used and thereby providing an upper outer wall portion against which a portion of the band may engage.

3. A mixing bowl comprising a bowl body having an outer wall surface of gradually increasing external diameter from its base to its upper rim and integral externally projecting means adjacent said upper rim for attachment of a handle band, said projecting means having an outer face of greater diameter than said outer wall surface and providing upper and lower substantially horizontal ledges joining the face to said outer wall surface, said face being substantially straight and completely free of reentrant portions between said shoulders, and a handle attachment band having an annular recess in its inner surface providing internally projecting substantially parallel top and bottom flanges engaging said top and bottom ledges, said flanges each terminating at the outer wall surface of the bowl, the upper ledge of the projecting means being spaced below the upper rim of the bowl a distance less than the thickness of the top flange on said band, whereby the upper surface of said flange projects above said rim and protects the rim against damage during use of the bowl.

References Cited in the file of this patent

UNITED STATES PATENTS

| Number | Name | Date |
|---|---|---|
| D. 30,757 | Wipf | May 16, 1899 |
| 95,742 | Stevens | Oct. 12, 1869 |
| 104,859 | Lawrence | June 28, 1870 |
| 186,750 | Newton | Jan. 30, 1877 |
| 248,583 | Fischer | Oct. 25, 1881 |
| 1,357,940 | Berry | Nov. 9, 1920 |
| 2,299,730 | Bornstein | Oct. 27, 1942 |
| 2,359,189 | Alsdorf | Sept. 26, 1944 |

FOREIGN PATENTS

| Number | Country | Date |
|---|---|---|
| 8,855 | Great Britain | May 4, 1894 |